United States Patent

[11] 3,571,872

| [72] | Inventor | John L. Van Den Kieboom |
| | | St. Clair Shores, Mich. |
| [21] | Appl. No. | 748,852 |
| [22] | Filed | July 30, 1968 |
| [45] | Patented | Mar. 23, 1971 |
| [73] | Assignee | La Salle Machine Tool, Inc. |
| | | Warren, Mich. |

[54] PALLET LOCATING AND CLAMPING APPARATUS
11 Claims, 7 Drawing Figs.

| [52] | U.S. Cl. | 29/1 |
| [51] | Int. Cl. | B23g 3/00 |
| [50] | Field of Search | 104/134; 29/1.5, 33.12 |

[56] References Cited
UNITED STATES PATENTS

| 2,484,887 | 10/1949 | Hoier | 29/1.5 |
| 2,673,386 | 3/1954 | Cross | 29/1.5 |

*Primary Examiner*—Arthur L. LaPoint
*Assistant Examiner*—D. W. Keen
*Attorney*—Olsen and Stephenson

ABSTRACT: Apparatus for supporting and transferring workpieces for successive machine operations, including rails on which a series of pallets adapted to support the workpieces can be positioned. A fixture adapted to be mounted adjacent to a machine tool is provided for locating a pallet and subsequently for clamping the pallet to their rails at such location. A single actuator bar is provided for actuating the locating and clamping elements of the fixture.

INVENTOR
JOHN L. VAN DEN KIEBOOM
BY
Olsen and Stephenson
ATTORNEYS

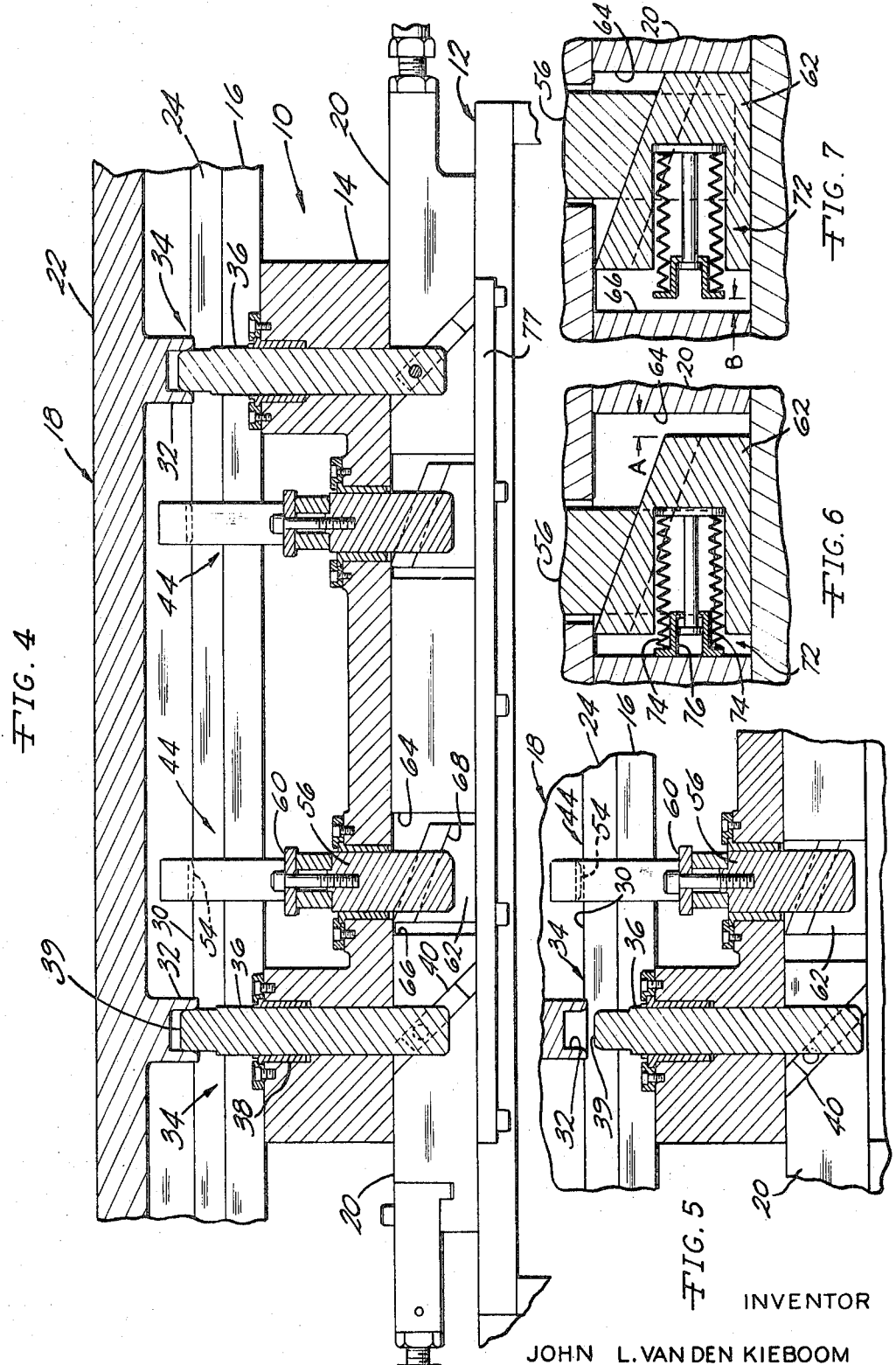

PALLET LOCATING AND CLAMPING APPARATUS

BACKGROUND OF THE INVENTION

It is conventional practice in the operation of certain types of machine tools to move workpieces on rails adjacent to a series of machine tools for performing successive machine operations on the workpieces carried by pallets. When adjacent to the machine tool, the pallet is located for the purpose of positioning the workpiece with respect to the machine tool which is to perform the work, and the pallet is then securely clamped in the located position. A locating and clamping mechanism of the type described is disclosed, for example, in U.S. Pat. No. 2,120,966, issued Jun. 21, 1938 to Clark.

It is also conventional practice to arrange a number of machine tools in series where a plurality of operations are to be performed on the workpieces. In installations of this type, the pallets are moved successively from one machine tool to another, and a separate locating and clamping mechanism is provided adjacent to each machine tool. Separate locating and clamping fixtures are required for each machine tool, so that each pallet is properly located adjacent to such machine tool assuring that the work will be accurately performed. It is the usual practice to transfer all of the pallets at the same time, and after the pallets have been transferred, they are all located and simultaneously clamped in preparation for machining operations on the workpieces. Thus, it is desirable that the individual locating and clamping fixtures be connected for simultaneous operation by a single actuator bar.

Apparatus of the type disclosed in the U.S. Pat. No. 2,120,966 to Clark, has various shortcomings, which will not be discussed in detail, but one of which is the inability of the actuating mechanisms shown therein to provide satisfactory simultaneous operation of a plurality of locating and clamping fixtures. These difficulties arise, because if one clamping mechanism is out of phase with the operation of the other clamping mechanisms, the first clamping mechanism to engage will prevent further clamping action of the remaining clamps, and thereby only one fixture can operate satisfactorily for holding its associated pallet in place. Under these circumstances, it becomes necessary to utilize independent or separate actuating mechanisms for each of the locating and clamping fixtures.

Efforts have been made to provide locating and clamping fixtures which can be connected for simultaneous operation, wherein the clamping action of one fixture will not interfere with the clamping actions of the other fixtures. An example of such a prior art teaching is found in U.S. Pat. No. 2,673,386, issued Mar. 20, 1954 to Cross. In prior art apparatus of this type, independently operated spring actuators are provided for each clamp, and a common actuator bar assembly is provided for releasing the spring pressure of each spring to actuate its associated clamp. Such arrangements are not entirely satisfactory, because the forces applied by the actuator bar are not transmitted to the clamps, but instead, each clamp has an independent spring upon which the clamp must rely for supplying the forces utilized to clamp the pallet in place.

It is one of the objects of the present invention to provide an improved apparatus including locating and clamping fixtures which are constructed and arranged so that a single actuator bar can be used for actuating locating pins of a plurality of such fixtures, and after such fixtures are properly located, to actuate the clamps of the fixtures in response to forces applied directly by the actuator bar, the arrangements of the parts being such that clamping of one clamp will not interfere with the clamping action of the other clamps.

According to a preferred form of the present invention there is provided a pallet having a clamping surface and a locating socket, rail means or ways for supporting the pallet for movement to a plurality of stations, and a pallet clamping fixture located at each of the stations. The pallet clamping fixture comprises a stationary frame, a locating pin supported in the frame and movable between a first position in which one end is in locating position relative to the socket and a second position in which said one end is retracted therefrom. A clamp is supported on the frame and movable between a first position clampingly engaging the clamping surface for holding the pallet against said rail means or ways and a second position out of engagement with said clamping surface. An actuator bar is movable longitudinally relative to the frame, and means are operably connected to said locating pin and to said actuator bar for moving the pin to its first position upon movement of the actuator bar in one direction and for retracting the pin upon movement of the actuator bar in the other direction. Means are also operably disposed between the clamp and between the actuator bar, and such means are responsive to forces applied to the actuator bar for moving the clamp to its first position after the actuator bar has completed an initial portion of its stroke in the one direction and for releasing said clamp when the bar is moved in the other direction. The last-named means includes a spring mechanism through which forces applied to the actuator bar are transmitted to the clamp when the actuator bar is moved in said one direction so that a plurality of such clamps can be actuated by the actuator bar and clamping of one clamp will not interfere with clamping of the other clamps.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 4 is a vertical section taken on the line 4–4 of FIG. 1, showing the locating pins and clamps in a position holding a pallet in a properly located position;

FIG. 5 is a fragmentary sectional view, similar to FIG. 4, but showing a locating pin and clamp mechanism in a disengaged position;

FIG. 6 is a fragmentary section through the clamping mechanism when in a clamped position; and FIG. 7 is a view similar to that of FIG. 6, but showing the clamping mechanism in an unclamped position.

DESCRIPTION OF THE PREFERRED EMBODIMENT

Figure 1:
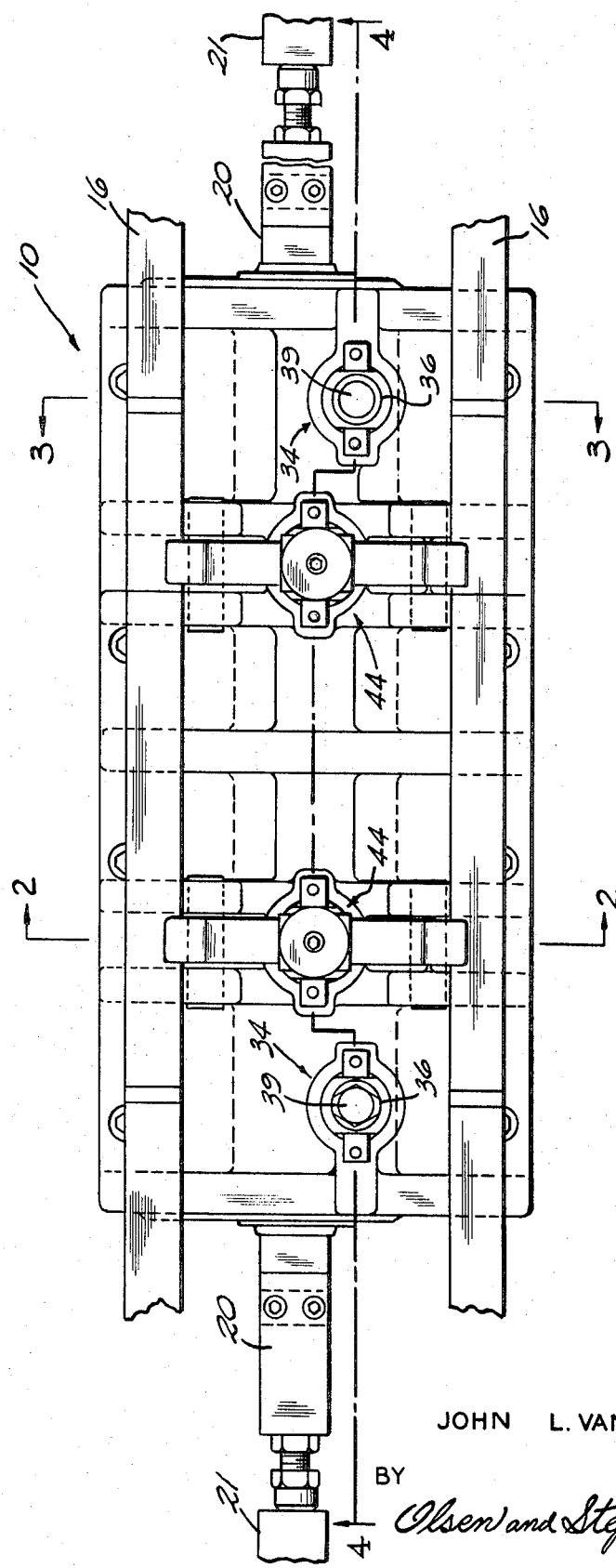
FIG. 1 is a top plan view of a locating and clamping fixture embodying the present invention, showing fragments of the rail means and actuator bar associated therewith.
Figure 2:
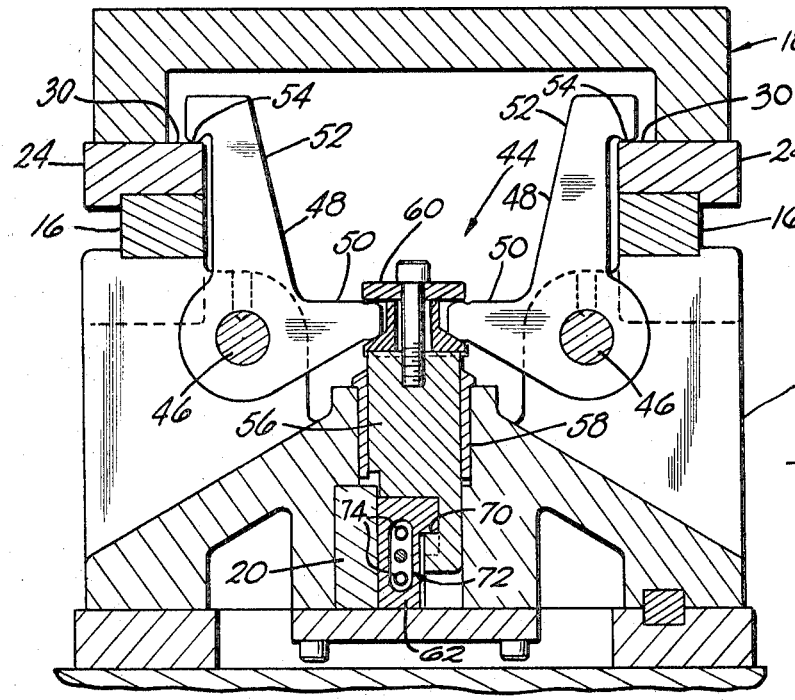
FIG. 2 is a section taken on the line 2–2 of FIG. 1, showing details of the clamping mechanism.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawings, the invention will be described in greater detail. As previously indicated, the apparatus comprising the present invention is adapted to be used with a plurality of machine tools, (not shown) for transmission of workpieces successively from one machine tool to the next, and initially to locate and then to clamp in place adjacent to the machine tools pallets which support the workpieces.

The locating and clamping fixture 10 is rigidly secured to a base member 12. The locating and clamping fixture 10 has a rigid frame 14 on which is mounted rail means or ways 16 adapted to support and to permit longitudinal travel thereon of a pallet 18. Positioned on a base supported retainer plate 77 and longitudinally movable thereon is an actuator bar 20 connected at its opposite ends to similar actuator bars 21 positioned in other aligned locating and clamping fixtures (not shown).

The pallet 18 has an upper surface 22 on which a workpiece or workpieces are adapted to be mounted for transfer to the aligned machine tools. The pallet 18 is provided on its underside with a pair of pallet runners 24 which are adapted to travel on the rail means or ways 16. Each of the pallet runners 24 has a surface 26 with a shoulder 28 thereon for engagement with the associated rail means or way 16. The shoulders 28, being on the outer sides of the rail means 16, restrict the pallet to longitudinal travel on the rail means. Thus, the pallet 18 is free to travel longitudinally of the rail means 16 and to be held against lateral displacement thereon by the shoulders 28.

Each of the pallet runners 24 also has a clamping surface 30, the purpose of which will shortly be described. Also, the pallet has locating surfaces in the form of a pair of sockets 32, which are adapted to be engaged by elements of the locating and clamping fixture 10, as will presently be described.

The locating mechanism 34 of the present invention will now be described, with particular reference to FIGS. 1, 3, 4 and 5. The locating mechanisms 34 are two in number in the illustrated embodiment of the present invention, and only the locating mechanism shown on line 3–3 in FIG. 1 will be described, because these mechanisms are essentially the same.

Figure 3:
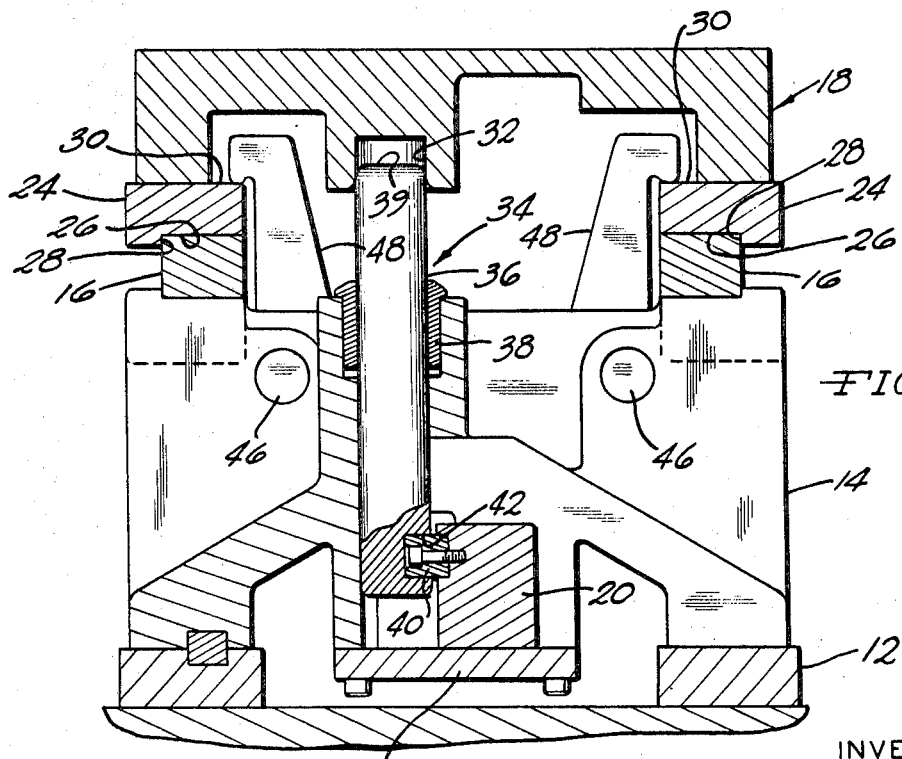
FIG. 3 is a section taken on the line 3–3 of FIG. 1, showing details of the locating pin mechanism.

The locating mechanism 34 includes a locating pin 36 which is supported in the bushing 38 mounted in the frame 14 for vertical reciprocating movement. When raised to its upper position as shown in FIGS. 3 and 4, the upper end of the pin 36 extends into the socket 32 so as to locate the pallet 18 accurately with respect to the frame 14 and base 12. When the locating pin 36 is in its lowermost position shown in FIG. 5 the upper end 39 will be out of socket 32 so that the pallet 38 can be moved longitudinally along the rail means or ways 16.

The locating pin 36 is moved to its upper or first position and to its lower or second position by means of the actuator bar 20. For this purpose, the actuator bar 20 has an inclined cam element 40 secured thereon, as shown in FIG. 3, and the locating pin 36 has a corresponding inclined cam surface or slot 42 which is adapted to travel on the cam element 40. When the actuator bar is moved to the left, as shown in FIG. 5, the cam slot 42 of the locating pin 36 will travel to the lower end of the cam element 40, and when the actuator bar 20 is moved to the right, as shown in FIG. 4, the cam slot of the locating pin 36 will travel to the upper end of the cam element 40. Thus, movement of the actuator bar 20 to one of the other longitudinal direction will serve the purpose of moving the locating pins 36 respectively to their first or upper positions, or to their second or lower positions. It will be noted that the terminal ends of the locating pins 36 are a chamfered so as to pilot the locating pins into the sockets 32. This construction is utilized so that if the pallet 18 is displaced a slight amount from its proper position, the locating pins 36 will penetrate the sockets and will then shift the pallet to its correct location with respect to the associated machine tool (not shown).

Referring now to FIGS. 1, 2 and 4—7, the clamping mechanism utilized in the present invention will be described in greater detail. Two similar clamping mechanisms 44 are provided in the disclosed embodiment, and only the one shown on line 2–2 of FIG. 1 will be described in detail. Each clamp mechanism 44 includes a pair of clamp pivot shafts 46 on which are pivotally mounted clamps or bell crank levers 48, each having a short arm 50 and a long arm 52. Each long arm 52 has a terminal end 54 adjacent to the clamping surface 30 of pallet 18 adapted, when clamp 48 is pivoted, to engage in clamping relation the surface 30. As seen best in FIG. 2, when this occurs, the pallet 18 will be rigidly clamped against the rail means or way 16.

The clamps 48 are pivotally moved in response to raising or lowering of the clamp actuator rod 56 which is supported in the bushing 58 in frame 14. The upper end of the clamp actuator rod 56 has a retaining means 60 for retaining the distal ends of the short arms 50, and the lower end of the actuator rod 56 is in operative engagement with a wedge block 62 which is operatively disposed between abutment surfaces 64 and 66 of the actuator bar 20. The clamp actuator rod 56 is connected to the wedge block 62 in such a manner that when the wedge lock 62 is moved by the actuator bar 20 to the right, as viewed in FIG. 4, the clamp actuator rod 56 will move to its first or upper position, and when the wedge block 62 is moved to the left by the actuator bar 20, as viewed in FIG. 5, the clamp actuator rod 56 will be moved to its second or lower position. It will be readily understood that when the actuator rod 56 is in its second or lower position, the clamp 48 will be out of engagement with the pallet runner 24, thereby releasing the pallet for movement along the rail means 16, and when the clamp actuator rod 56 is in its first or upper position, the clamp 48 will be in its clamped position with respect to the pallet runner 24.

The actuator rod 56 is moved to its first or second positions in response to the movement of the wedge block 62. For this purpose, the wedge block 62 has a cam element 68 which is adapted to travel in a corresponding cam recess 70 in the clamp actuator rod 56. Movement of the wedge block 62 along the surface of the retainer plate 77 will thereby cause vertical movement of the clamp actuator rod 56. Movement of the wedge block 62 in either direction on the surface of the retainer plate 77 is caused by corresponding movement of the actuator bar 20. As previously indicated, it is necessary that the locating pins 36 properly locate the pallet 18 prior to the time that the clamps 48 secure the pallet against the rail means 16. In order to provide this delayed clamping action on the part of the clamps 48, the abutment surfaces 64 and 66 are spaced apart a greater distance than the length of the wedge block 62. By virtue of this arrangement, when the actuator bar 20 is initially moved in either direction, the locating pin 36 will immediately be moved vertically in the appropriate direction, but movement of the actuator rod 56 will not occur until either the abutment face 64 or 66 has moved into engagement with the associated end face of the wedge block 62. This delay in movement of the wedge block 62 will enable the locating pins 36 to have performed their locating function prior to the clamping action taking place.

Referring to FIGS. 6 and 7, it will be seen that when the actuator bar 20 is in its extreme position to the right, the wedge block 62 will have been moved to the position shown in FIG. 6 wherein the clamp actuator rod 56 is in its uppermost position, and it will be noted that the wedge block 62 is then spaced from the abutment surface 64 by the distance A. Thus, it will be necessary for the actuator bar 20 to have moved the distance A before the wedge block 62 will be engaged, and under these circumstances, the locating pin 36 will have been lowered to a position out of the socket 32, before initial movement of the actuator rod 56 toward its lowermost position is initiated. Similarly, when the actuator bar 20 is in its extreme position in the other direction, as is shown in FIG. 7, the abutment surface 66 will then be spaced from the opposite end of the wedge block 62 and the preloaded compression spring mechanism 72 carried therein. The effective distance in this instance is represented by the dimension B. Thus, when the actuator rod 56 is in its lowermost position, movement of the actuator bar 20 to the right will have no effect initially upon the wedge block 62 and thereby the actuator rod 56. However, after the actuator bar 20 has moved the distance B to the right, it will engage the preloaded compression spring 72 and initiate movement of the wedge block to the right and thereby initiate movement of the actuator rod 56 upwardly. This initiating movement does not occur until after the locating pin 56 has penetrated the socket 32 to locate the pallet in the proper position for clamping to the rail means 16. As the actuator bar 20 moves farther to the right, the compression spring mechanism 72 will continue to urge the wedge block 62 to the right and thereby will continue to urge the actuator rod 56 upwardly to its uppermost position.

The compression spring mechanism 72 is employed in the wedge block 62 so that in the event any of the clamp mechanisms are slightly out of phase with other clamp mechanisms of the complete system, the clamp mechanism which engages first will not interfere with the subsequent engaging of the other clamp mechanisms. It will be appreciated that in the absence of a spring mechanism 72, it would be possible for one of the actuator rods 56 to effect clamping of its associated clamp and then to restrict movement of the actuator bar 20 so that clamps at other pallets would not assume a clamping position. However, the spring mechanism 72 overcomes this problem so that proper clamping action of all such clamps that are actuated by the actuator bar 20 is assured.

The compression spring mechanism 72 includes two coil springs 74 which are retained in a preloaded state by the conventional retainer assembly 76.

I claim:

1. In an apparatus for holding workpieces for successive machine operations, the combination of a pallet having a clamping surface and a locating surface, rail means for supporting said pallet for movement to a plurality of stations, and a pallet clamping fixture at one of said stations comprising a stationary frame, a locating pin supported in said frame and movable between a first position in which one end is in locating position relative to said locating surface and a second position in which said one end is retracted therefrom, a clamp supported on said frame and movable between a first position clampingly engaging said clamping surface for holding said pallet against said rail means and a second position out of engagement with said clamping surface, an actuator bar longitudinally movable relative to said frame, means operably connected to said locating pin and to said actuator bar for moving said pin to its first position upon movement of said actuator bar in one direction and for retracting said pin upon movement of said actuator bar in the other direction, and means operably disposed between said clamp and said actuator bar and responsive to forces applied to said actuator bar for moving said clamp to its first position after the actuator bar has completed an initial portion of its stroke in said one direction and for releasing said clamp when said bar is moved in the other direction, the last-named means including a spring mechanism through which force applied to said actuator bar is transmitted to said clamp when said actuator bar is moved in said one direction so that a plurality of such clamps can be actuated by said actuator bar and clamping of one clamp will not interfere with clamping of other clamps.

2. In an apparatus for holding workpieces for successive machine operations, the combination as defined in claim 1 wherein the means operably disposed between said clamp and said actuator rod includes a wedge block and an associated clamp-actuator rod, said block and said rod having abutting complementary inclined planes for effecting movement of said rod in either axial direction in response to movement of said block in either longitudinal direction of said actuator bar, said rod being connected to said clamp for moving the latter, and said block being in juxtaposition to said actuator bar to be moved thereby in either direction after the initial portion of the stroke of the bar has occurred in either direction.

3. In an apparatus for holding workpieces for successive machine operations, the combination as defined in claim 2 wherein a spring mechanism is supported by said wedge block and through which the forces applied to the wedge block by said actuator bar are transmitted when said actuator bar is moved in said one direction.

4. In an apparatus for holding workpieces for successive machine operations, the combination as defined in claim 1 wherein said locating surface comprises a socket into which the end of said locating pin can enter.

5. A pallet locating and clamping fixture comprising a frame, a locating pin mounted for reciprocable movement in said frame between locating position and a retracted position, a clamp mounted on said frame for movement between a clamping position and a release position, an actuator bar movable relative to said frame, pin-actuator means operably connecting said locating pin and said actuator bar for moving said pin to its locating position upon movement of said actuator bar in one direction and for retracting said pin upon movement of said actuator bar in the other direction, and clamp-actuator means operably positioned between said clamp and said actuator bar and responsive to forces applied to said actuator bar for moving said clamp to its clamping position after the actuator bar has completed an initial portion of its stroke in said one direction and for releasing said clamp when said bar is moved in the other direction, said clamp-actuating means including a spring mechanism through which force applied to said actuator bar is transmitted to said clamp when said actuator bar is moved in said one direction.

6. A pallet locating and clamping fixture as defined in claim 5, wherein said actuator bar includes two abutment surfaces in spaced relation along its length, and said clamp-actuator means includes a slidable wedge block positioned between said abutment surfaces and of a length smaller than the distance between said abutment surfaces for selective engagement thereby, and a clamp-actuator rod supported in said frame for reciprocable movement and seated at one end on the inclined surface of said wedge block, the other end of said clamp-actuator rod operatively engaging said clamp for actuating the same on movement of said clamp-actuator rod.

7. A pallet locating and clamping fixture as defined in claim 6, wherein said spring mechanism comprises a preloaded compression spring supported in said wedge block and engageable with one of said abutment surfaces when said wedge block is moved in one direction by said actuator bar.

8. A pallet locating and clamping fixture comprising a frame, a locating pin mounted for reciprocable movement in said frame between a locating position and a retracted position, a clamp mounted on said frame for movement between a clamping position, an actuator bar movable relative to said frame, pin-actuator means operably connecting said locating pin and said actuator bar for moving said pin to its locating position upon movement of said actuator bar in one direction and for retracting said pin upon movement of said actuator bar in the other direction, and clamp-actuator means operatively positioned between said clamp and said actuator bar and responsive to forces applied to said actuator bar for moving said clamp to its clamping position after the actuator bar has completed an initial portion of its stroke in said one direction and for releasing said clamp when said bar is moved in the other direction, said actuator bar having two abutment surfaces in spaced relation along its length, and said clamp-actuator means including a slidable wedge block operatively positioned between said abutment surfaces and of a length smaller than the distance between said abutment surfaces for selective engagement thereby, and a clamp-actuator rod supported in said frame for reciprocable movement and seated at one end on the inclined surface of said wedge block, the other end of said clamp-actuator rod operatively engaging said clamp for actuating the same on movement of said clamp-actuator rod.

9. A pallet locating and clamping fixture as defined in claim 8, wherein said clamp-actuator means includes a spring mechanism operatively positioned between said actuator bar and said clamp to impart a resilient clamping force to said clamp when said clamp is moved to its clamping position.

10. A pallet locating and clamping fixture as defined in claim 9, wherein said frame is supported on a base member, and said actuator bar and said wedge block are slidably positioned on said base member.

11. A pallet locating and clamping fixture as defined in claim 9, wherein a second clamp is mounted on said frame adjacent to the first-named clamp for movement between a clamping position and a release position, and the other end of said clamp-actuator rod also operatively engages the second clamp for actuating the same on movement of said clamp-actuator rod.

PO-1050
(5/69)

UNITED STATES PATENT OFFICE
CERTIFICATE OF CORRECTION

Patent No. 3,571,872      Dated March 23, 1971

Inventor(s) John L. Van Den Kieboom

It is certified that error appears in the above-identified patent and that said Letters Patent are hereby corrected as shown below:

Col. 5, claim 5, line 67, insert -- a -- before "locating".

Col. 6, claim 8, line 33, after "position" and before the comma insert -- and a release position --.

Signed and sealed this 29th day of June 1971.

(SEAL)
Attest:

EDWARD M. FLETCHER, JR.
Attesting Officer

WILLIAM E. SCHUYLER, JR.
Commissioner of Patents